June 26, 1928.
W. L. HAMILTON
1,674,720
AUTOMATIC REGULATOR
Original Filed May 12, 1922    2 Sheets-Sheet 1
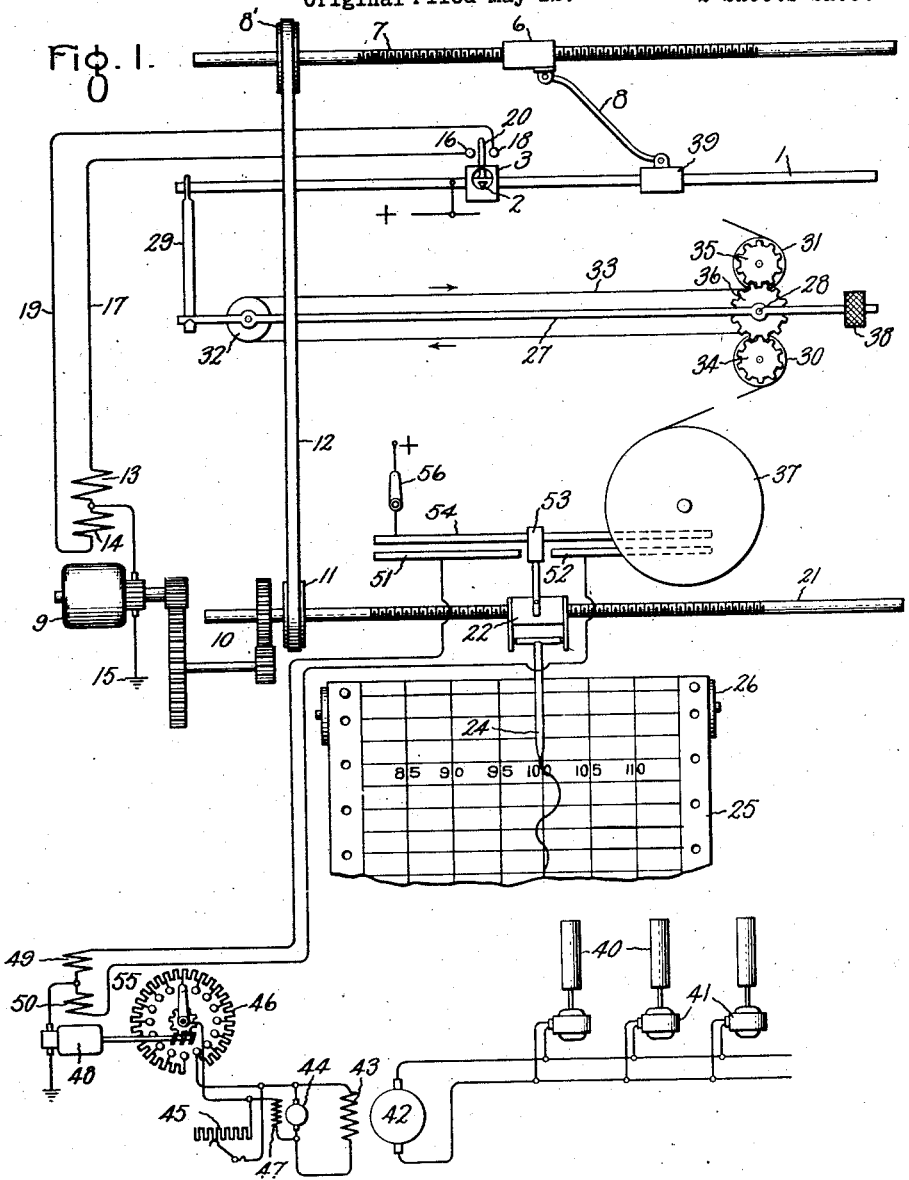
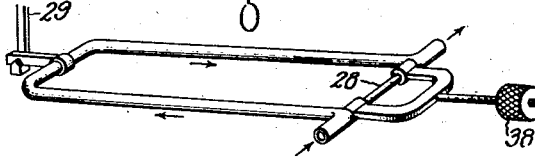
Inventor:
Walter L. Hamilton,
by Alexander F. [illegible]
His Attorney.

June 26, 1928.
W. L. HAMILTON
AUTOMATIC REGULATOR
Original Filed May 12, 1922      2 Sheets-Sheet 2
1,674,720
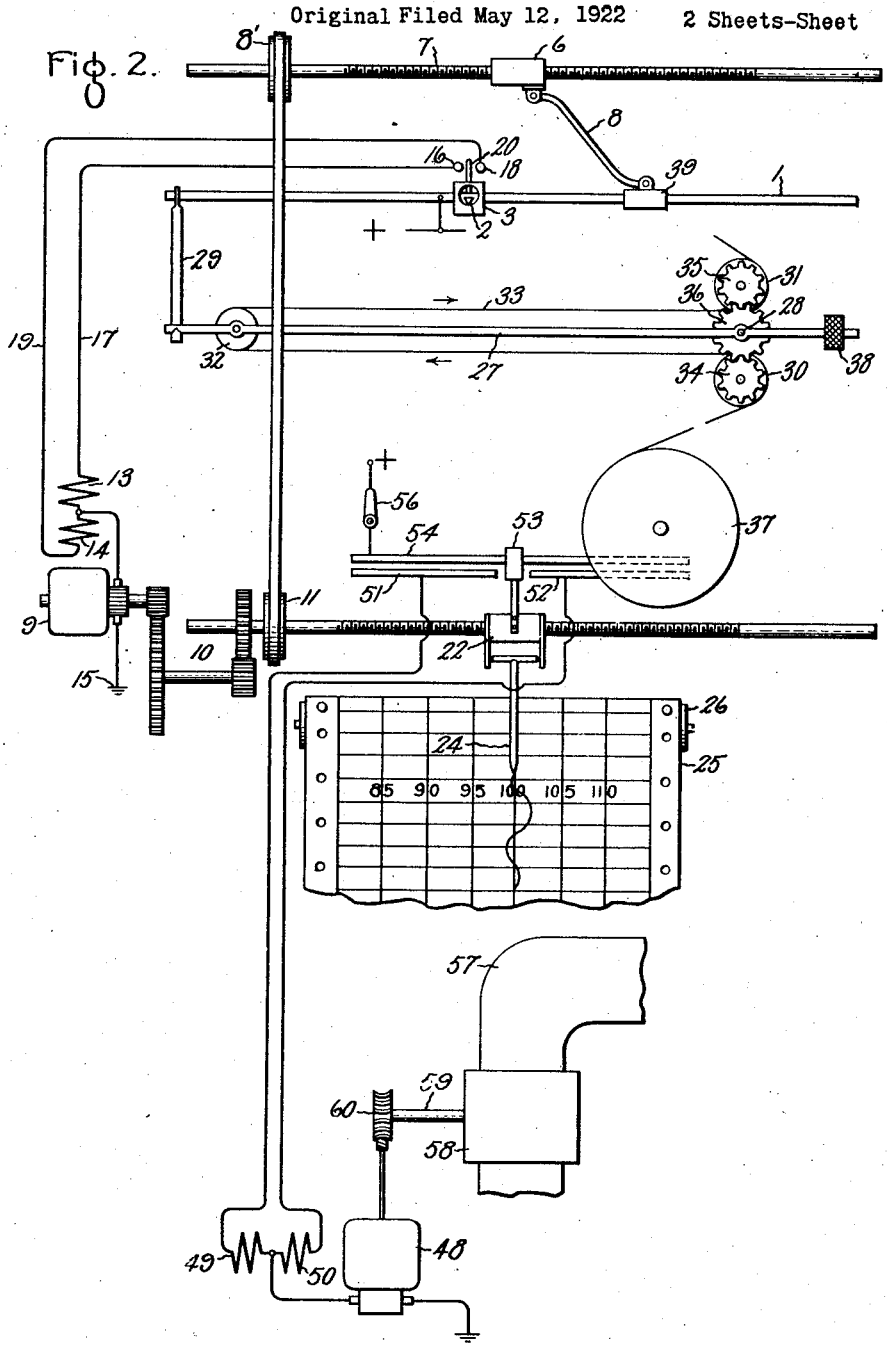
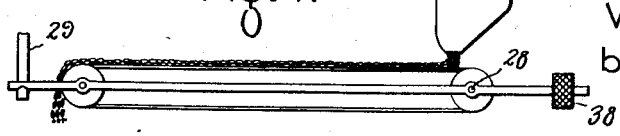
Inventor:
Walter L. Hamilton,
by *Alexander S. ...*
His Attorney.

Patented June 26, 1928.

1,674,720

UNITED STATES PATENT OFFICE.

WALTER L. HAMILTON, OF HOLYOKE, MASSACHUSETTS, ASSIGNOR TO GENERAL ELECTRIC COMPANY, A CORPORATION OF NEW YORK.

AUTOMATIC REGULATOR.

Original application filed May 12, 1922, Serial No. 560,399. Divided and this application filed June 5, 1924, Serial No. 717,976. Renewed November 14, 1927.

This application is a division of application, Serial No. 560,399, filed May 12, 1922, entitled "Weighing machine".

In my prior application referred to, I have described and claimed a weighing machine provided with means for automatically recording the weight of the article or commodity being weighed, the machine being preferably arranged to continuously weigh a definite quantity of a moving substance as it is produced or manufactured, for example, a definite length of sheet paper as it comes from the paper mill. In said application I have also described means whereby the weighing machine may perform automatic regulating functions in such a way as to maintain uniform the commodity being weighed, and it is this aspect of my invention which is claimed in the present application.

In continuous manufacturing processes, it is often important that frequent sampling or testing of the product be made in order to be assured that it conforms to a given standard. In many such processes, a convenient and reliable method of accomplishing this sampling is to weigh a definite portion of the product at frequent intervals. Thus in the manufacture of paper, it is of prime importance in order to obtain a product of uniform thickness that the weight of the paper be determined at frequent intervals in order that any deviation from the correct thickness be quickly detected and corrected. The manufacture of paper, like many other continuous manufacturing processes, is carried on day and night. The industry in general is handicapped by the lack of suitable apparatus for maintaining a constant weight of material and thus the provision of automatic devices for performing these functions will be of material benefit in decreasing the cost of manufacture and increasing the quality of the product.

While I have particularly mentioned the paper manufacturing industry, and will illustrate my invention in connection therewith, I do not intend to limit my invention to this particular field as it will be evident to those skilled in the art that the broad principles thereof are applicable to manufacturing processes in general. Thus in the claims appended hereto, I will particularly point out the features of my invention which are believed to be novel and patentable and I will illustrate practical applications thereof by means of the following description taken in connection with the accompanying drawings in which Figs. 1 and 2 illustrate preferred embodiments of my automatic weighing and recording machine as used to control, in Fig. 1, the speed of a paper mill and in Fig. 2, the quantity of pulp used in a paper mill; Fig. 3 shows how the automatic weighing machine may be used in a continuous liquid manufacturing process; and Fig. 4 shows the application of the weighing machine as used to continuously weigh a definite quantity of a granular substance.

Referring now to the drawings, and in particular to Fig. 1, where I have disclosed an arrangement for continuously weighing a definite length of sheet fabric, for example, paper, as it is produced by the mill, together with automatic weight recording means and means for automatically controlling the speed of the paper mill. In this figure, 1 represents a scale beam pivoted at 2 near its center in a stationary bracket 3. One end of this beam carries an adjustable weight 39, and the other end supports by means of a hinged rod 29, a framework 27 adapted to support a definite length of the paper as it comes from the mill. For this purpose I have shown a pair of spaced rollers 30 and 31 secured to the framework 27 adjacent the pivot point 28 and a roller 32 secured near the opposite end of the framework over which the paper sheet 33 is continuously passed when the mill is in operation. To secure a good mechanical construction, the spaced rollers 30 and 31 may be provided with gears 34 and 35 meshing with a gear 36 rotatably mounted concentric with the pivot point 28. By this arrangement, the paper may be continuously drawn through the rolls in the following manner: The paper is fed to roll 30 from an idler roller 37, thence to roller 32, back again to roller 31 and then out to a winding roller, not shown. Thus a definite length of the paper is supported by the framework and any variation in its weight is made to influence the scale beam and weighing mechanism. The framework is preferably provided with a counterweight 38 for adjusting purposes.

The weight imposed upon the scale beam 1 by the framework and paper supported thereby is arranged to be counterbalanced by the sliding weight 39 which is secured to nut 6 through the hinged rod 8. The position of nut 6 and weight 39 is controlled by a motor 9. The nut 6 is threaded on the shaft 7 which is provided with a pulley 8'. The pulley 8' is driven from motor 9 through the gearing represented at 10, the pulley 11 and the belt 12. The motor is shown as the reversible series type provided with two field windings 13 and 14. One side of the armature is connected to ground at 15 and the other side is connected between the field windings. The other terminals of the field windings are arranged to be connected to the positive side of the line through motor reversing contacts controlled by the scale beam 1. Thus the field winding 13 is connected to stationary contact 16 through lead 17, field winding 14 is connected to stationary contact 18 through lead 19, and a movable contact 20 mounted on the scale beam and electrically connected to the positive side of the line is arranged to play between these stationary contacts to close the motor circuit for one direction of rotation when the weight on framework 27 predominates to close the circuit for the opposite direction of rotation when weight 39 predominates and to keep the motor circuit open when the scale beam is balanced. When the motor circuit is closed by the unbalancing of the scale beam, its direction of rotation is such as to move nut 6 and weight 39 in the direction to bring the scale beam back to a balanced position at which time the motor switch is opened and the movement stopped. It will thus be evident that if a sample of paper of given width is passed over the framework 27 and the proper adjustments are made, the paper will be automatically weighed and the position which nut 6 assumes after a balance is reached may serve as an indication of the weight of the paper.

In the present illustration, instead of attaching indicating means directly to nut 6, I provide a similar worm and nut device for performing this function which is operated by the pulley 11. Pulley 11 is secured to a shaft 21 which has a portion of its length threaded and carries thereon a nut 22. This nut carries a pointer 24 which terminates in a stylus cooperating with the record sheet 25. The record sheet is arranged to be advanced at a constant rate over a roller 26 by mechanism not shown in a well understood manner. When motor 9 is operated, nuts 6 and 22 will move along their respective worm shafts in one direction or the other, depending upon the direction of unbalancing of beam 1 and in so doing, will move weight 39 and stylus 24 until a balanced condition is reached. The stylus 24 will thus be caused to move over the record sheet at right angles to the direction of movement of the latter and in so doing, will draw a line thereon in a well understood manner. The record sheet is calibrated transversely in percentage weights of the paper sample or other material and lengthwise in time units. The weight 39 will be adjusted to such a position of value that when the record stylus 24 indicates 100 per cent on the record sheet 25, with a paper sample of correct weight passing over the framework 27, the scale beam 1 will be in balance. In the present illustration the nuts 6 and 22 are arranged to move in the same direction along their respective shafts for a given direction of rotation of motor 9.

The curve obtained by the continuous weighing machine follows the variation in weight of the paper passing over the framework 27 so that a visible indication and a continuous record of the weight, and hence the thickness of the paper being produced is obtained. This feature provides a comprehensive and complete record of the quality of paper produced and the performance of the paper making machine. As each complete roll of paper is finished, it can be given a number and corresponding number noted on the record sheet. Then the manufacturer has only to glance at the record sheet to ascertain the nature of the paper in any particular roll as regards its thickness. He can see at a glance whether it is good or bad, as well as how much and what particular portion of the roll is bad. The length of the record sheets also gives an approximate indication of the length of the paper in the roll. Another valuable feature of the continuous weighing machine is that the paper need never be cut to obtain a sample.

In the manufacture of paper, the most important consideration affecting the thickness of the paper is the speed of the paper making rolls. Other things being equal, the thickness of the paper varies inversely as the speed of the roll and I provide automatic means controlled in accordance with the position of nut 22 for regulating the speed of the paper mill so that its product is maintained uniform and of the correct thickness.

I have diagrammatically illustrated at 40 the rolls of a paper machine. In this instance, I have represented the various rolls as being driven by individual electric motors 41 supplied in parallel from a common generator 42. The generator field 43 is supplied from an exciter 44. Adjustable resistances 45 and 46 are included in shunt to each other in the circuit of the exciter field which is designated at 47. The resistance 45 is manually adjustable and the resistance 46 is arranged to be adjusted automatically in accordance with the weight of the paper being produced by the paper machine. In the present illustration I have shown the automatic mechanism as consisting of a motor 48 having opposing fields 49 and 50, arranged similar to the motor shown at 9, and contacts 51 and 52 arranged to be separately energized by the contact 53 carried by the nut 22. The contact 53 slides on a long stationary contact 54 which is connected to the positive side of the line. When the weight of the paper is correct, the contact 53 stands in the position illustrated out of contact with both the contacts 51 and 52. Should the paper decrease in weight, the motor will be energized through field coil 49 and contacts 51, 53 and 54. The motor operates the means for adjusting the resistance 46 and in the present modification I have represented a usual form of motor operated rheostat designated in general by the numeral 55 for this purpose. When the motor is energized through field coil 49, it will operate in the proper direction to cut resistance into the exciter field circuit which will lower the current in the generator field and thus lower the voltage and speed of the motors 41. When the paper is over weight, the contact 53 will move to the right and energize the motor 48 through field coil 50 and contacts 52, 53 and 54, thereby cutting resistance out of the exciter field circuit, causing an increase in the speed of the paper machine. By properly adjusting the relative valves of the parallel resistances 45 and 46 and by including a suitable anti-racing device in conjunction with the motor operated rheostat, a very close automatic regulation of the paper making machinery may be obtained and thus the need of an attendant for watching the record sheet and performing manual adjustments is obviated. A switch 56 is provided for disconnecting the automatic controlling apparatus during such time as the paper machine is operating without paper and when adjustments for different weights of paper are being made.

I will now briefly review the complete operation of the apparatus of Fig. 1. With the machine in operation and a paper of the correct weight passing through the rolls, weight 38 will be adjusted until stylus 24 is on the 100% line of the record sheet when the scale beam is balanced. The remainder of the record sheet will be properly calibrated with the instrument. The resistances 45 and 46 will be so adjusted that when the nut 22 and contact 53 are in this position, the machine, running under normal conditions, of speed, feed, etc., will produce paper of the correct weight. Now, let us assume that the weight of the paper passing through the machine decreases. The right hand end of scale beam 1 will be depressed, thereby closing the circuit of motor 9 through contacts 18 and 20, line 19 and field coil 14. The motor starts in the proper direction to move weight 39 toward pivot 2 and nut 22 to the left. This will continue until the scale beam is balanced, at which time the operation just described will stop. The stylus 24 has in the meantime drawn a record of the decrease in weight of the paper on the continuously moving record sheet 25 and if the decrease in weight is sufficient, contact 53 will have moved to the left and energize motor 48 in the proper direction to decrease the current flowing through the exciter field causing the motors 41 to slow down. The paper machine will thus be slowed down in speed a very slight amount which under ordinary circumstances, will be sufficient to bring the weight of the paper back to its correct value and contact 53 to its central position.

The weight of the paper produced by the machine will also depend upon the amount of pulp deposited onto the usual continuously moving wire used in the initial stage of the sheet forming process. In Fig. 2 I have illustrated my weighing machine used for automatically controlling the flow of the pulp to the paper machine in accordance with the weight of the paper being produced. Such automatic controlling means may be used in conjunction with the speed control means of Fig. 1 or in conjunction with a paper machine which has automatic means for maintaining its speed constant. In Fig. 2 the feed pulp pipe to the paper machine is represented at 57. This pipe contains a valve 58 which is adapted to be controlled in the same manner as the rheostat 55 of Fig. 1.

In Fig. 2 the motor 48 is connected to the valve stem 59 by the worm gear 60. The pipe 57 instead of being the main feed pipe may constitute an auxiliary pipe in parallel with the main feed pipe. When the weight of the paper passing through the weighing machine is low, contact 53 will cause the motor 48 to be energized in the proper direction to open valve 58 slowly and when the paper is above the proper weight, valve 58 will be closed slowly. In other respects, the operation of the apparatus of Fig. 2 is similar to that of Fig. 1.

The details of construction and the purpose for which my automatic weighing machine and regulator issued may be modified to a considerable extent without departing from the spirit of the invention. The apparatus shown in Figs. 1 and 2 might be used to weigh a continuously moving thread, rope, wire, chain or sheet fabric, such as cloth; or I might provide a framework of hollow tubes and pass a liquid through the same, the inlet and outlet being on the axis of the pivot point 28 as indicated in Fig. 3. Such a modification would be useful in the continuous manufacture of liquid chemicals, liquid compounds, acids, molasses, etc. Again, I might provide the framework with a continuously moving belt upon which a definite volume of a granular substance is continuously deposited at one end and dumped off at the other as indicated in Fig. 4. In such cases, the various parts of the apparatus would be arranged to suit the conditions and the record sheet would be calibrated in the proper units. The automatic control of the mill or other apparatus may be changed to suit the conditions. Thus, if the weighing machine were to be used with liquid compound producing apparatus, the automatic control might vary the percentages of the various elements going to make up the compound, for example by valves controlled in accordance with the position of the nut 22 as illustrated in Fig. 2. In the production of molasses, or other evaporating processes, the position of the nut 22 might control the degree of heat to which the liquid is subjected. These and other modifications and uses will occur to those skilled in the art, and I intend to cover in the claims appended hereto all modifications and uses which fall within the true scope of my invention.

In accordance with the provisions of the patent statutes, I have described the principle of operation of my invention, together with the apparatus which I now consider to represent the best embodiment thereof; but I desire to have it understood that the apparatus shown is only illustrative and that the invention may be carried out by other means.

What I claim as new and desire to secure by Letters Patent of the United States, is:—

1. In combination apparatus for continuously producing sheet fabric, a weighing machine through which the sheet fabric is passed for automatically detecting variations in the weight thereof, and means controlled in response to changes in the weight of the sheet fabric being produced for regulating said apparatus in a manner to change the thickness of the sheet fabric produced thereby.

2. In combination apparatus for continuously producing sheet fabric, a weighing machine through which the finished fabric is passed for detecting variations in the weight thereof, and means controlled by said weighing machine in response to deviations in the weight of the finished fabric from a given standard for regulating the apparatus in a manner to correct the weight of the fabric being produced by changing its thickness.

3. In combination apparatus for continuously producing a continuous article of manufacture, a weighing machine through which said article is continuously passed as it is produced for detecting variations in its weight, recording means controlled by said weighing machine for continuously recording the weight of the article, and means controlled by said weighing machine for regulating the apparatus in a manner to cause the article to conform to a substantially constant weight.

4. In combination a machine for producing continuous sheets of fabric, apparatus for causing the fabric to conform to a substantially standard thickness comprising a machine for continuously weighing a constant width and length of the fabric as it is produced, and means controlled by said weighing machine for regulating said producing machine.

5. In combination a machine for producing continuous sheets of fabric, apparatus for automatically causing the fabric thus produced to conform to a substantially constant thickness comprising a device for continuously detecting minute variations in the thickness of the fabric as it is produced by continuously weighing said fabric, and means controlled by said measuring device for regulating the speed of said producing machine.

6. The method of controlling the operation of a machine for producing a uniform product which consists in continuously weighing the product as it is delivered from the machine and adjusting the speed of the machine in accordance with the indications of the weighing machine.

7. The method of controlling the operation of a machine for producing a uniform product which consists in continuously and automatically weighing the product as it is delivered from the machine and automatically adjusting the speed of the machine in accordance with the indications of the weighing machine.

In witness whereof, I have hereunto set my hand this 31st day of May, 1924.

WALTER L. HAMILTON.